J. E. CRONKHITE.
SILO.
APPLICATION FILED APR. 12, 1912.
1,147,378.
Patented July 20, 1915.
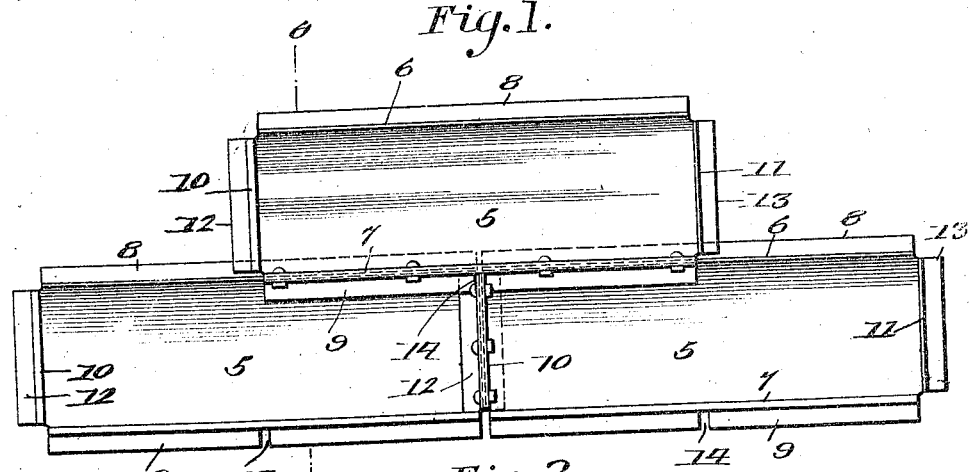
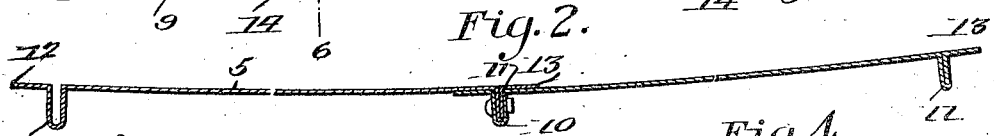
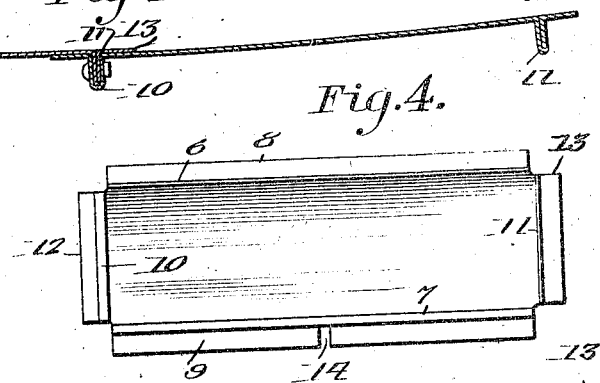
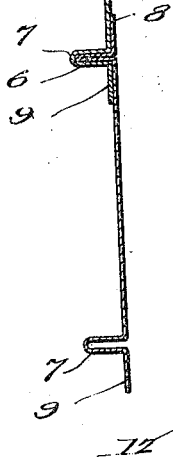
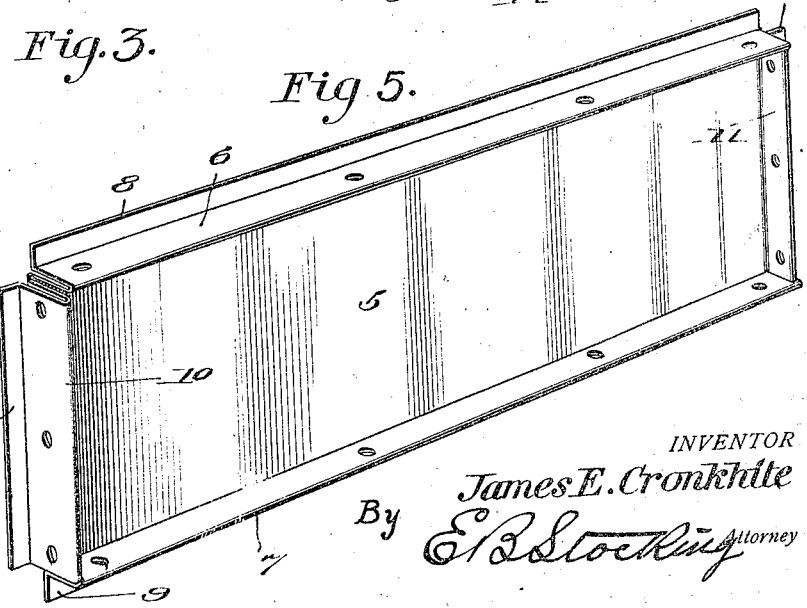
WITNESSES
P. E. Barnes
INVENTOR
James E. Cronkhite
By E. B. Stocking, Attorney

UNITED STATES PATENT OFFICE.

JAMES E. CRONKHITE, OF HITCHCOCK, OKLAHOMA.

SILO.

1,147,378.

Specification of Letters Patent.    Patented July 20, 1915.

Application filed April 12, 1912.  Serial No. 690,399.

*To all whom it may concern:*

Be it known that I, JAMES E. CRONKHITE, a citizen of the United States, residing at Hitchcock, county of Blaine, State of Oklahoma, have invented certain new and useful Improvements in Silos, of which the following is a specification, reference being had therein to the accompanying drawing.

This invention relates to certain new and useful improvements in silos and more particularly to metallic silos, the object being to provide a silo which is formed of a plurality of sections having interlocking connections whereby a silo can be easily and quickly installed or taken down, in order to allow the same to be transported from place to place.

Another object of the invention is to provide a silo in which the sections are united in such a manner that a substantially air tight joint is formed when the sections are interlocked.

Another object of the invention is to provide a silo in which the sections are arranged staggered whereby the silo will be strengthened in order to prevent the same from yielding the lap-joint of one pair of sections coming under the center portions of the adjacent sections.

With these objects in view: Figure 1, is a side elevation of three sections interlocked together showing the staggered arrangement thereof; Fig. 2, is a longitudinal horizontal section through a pair of sections; Fig. 3, is a section taken on the line 6—6 of Fig. 1; Fig. 4, is a detail front elevation of one of the sections; and Fig. 5, is a perspective view of one of the sections.

In constructing a silo according to my invention, I employ a plurality of longitudinally curved sections 5 provided with interlocking means at their marginal edges as clearly shown, said sections being staggeredly arranged as shown in Fig. 1.

The sections are preferably formed rectangular in shape, and are bent outwardly and back upon themselves to form substantially U-shaped portions 6 and 7 on their horizontal edges, said U-shaped portions terminating in vertical flanges 8 and 9. The ends of the sections are also bent outwardly and back upon themselves to form substantially U-shaped portions 10 and 11 terminating in flange portions 12 and 13. The U-shaped portions 11 and 7 are bent into such shape that when a series of these sections are united they will fit within the U-shaped portions 6 and 10 and, as shown in Fig. 1, the sections are united and secured firmly together by bolts passing through the interlocking connections. The flange 9 of each section is provided with a central notch 14 to receive the vertical flange portion of the interlocking ends of the adjacent sections and as clearly shown in Fig. 1, when a series of these sections are united, a substantially air-tight joint is formed between the sections. It will also be seen that each section, when bent into its proper shape, is substantially box-shape, that is, a marginal lateral flange is formed upon its four edges which terminates in a flange extending in the same plane as the body of the plate. When the sections are united the interlocking vertical portions of the abutting sections are arranged centrally of the interlocking section arranged above and below, and as shown, the flanges lop over in order to form a water-tight joint.

While I have shown and described the interlocking connections at the marginal edges of each section, constructed in this particular manner, it of course being understood that the joints can be formed reverse to that shown and that any suitable clamping means can be used without departing from the spirit of my invention.

From the foregoing description it will be seen that I have provided a silo which is formed of a plurality of longitudinally curved sections which are united to form a complete circle at their abutting ends and these sections are preferably formed of a suitable sheet metal which will yield in order to allow the same to be bent to assume the proper curvature. It will also be seen that the sections are interlocked at their upper and lower edges in such a manner that it is impossible for sections to accidentally become detached.

In the perspective view of the section shown in Fig. 5, the section is straight instead of curved longitudinally and in some cases a section of this construction will have advantages over a curved section, as when the same is sprung to form a curve, the interlocking ends of the adjacent sections will be held firmly together.

What I claim is:

1. A circular silo formed of a plurality of staggeredly arranged sections, each section composed of a longitudinally curved metal rectangular plate bent to form horizontal U-shaped portions upon its upper and lower edges terminating in vertical flanges and upon its ends in vertical U-shaped portions terminating in flanges, the vertical flange of the lower horizontal portion being centrally notched, one of each of the vertical and horizontal U-shaped portions being capable of fitting within the U-shaped portions of the adjacent section, the vertical U-shaped portions fitting in the notches of the adjacent section in order to support the U-shaped portion midway between its length.

2. A cylindrical silo formed of a plurality of longitudinally curved rectangular sections having substantially horizontally, laterally projecting U-shaped portions adjacent the upper and lower edges thereof terminating in flanges arranged in the plane of the body of the section, and vertically laterally projecting substantially U-shaped portions adjacent their ends terminating in flanges arranged in the plane of the bottom of the sections, the lower flange of each section being centrally notched, the U-shaped portions of said sections being interlocked together, the interlocking ends of one pair of sections fitting in the central notches of the section above, and the interlocking vertical and horizontal portions of said sections being in vertical and horizontal alinement respectively when arranged to form a complete silo.

In testimony whereof I affix my signature in presence of two witnesses.

JAMES E. CRONKHITE.

Witnesses:
 JAMES B. SCOTT,
 CLAUD L. FOUTZ.